(12) United States Patent
Auston, Jr.

(10) Patent No.: US 7,210,706 B1
(45) Date of Patent: May 1, 2007

(54) SUSPENSION LIFT BRACKETS

(76) Inventor: John E. Auston, Jr., 1950 E. Janice Way, Phoenix, AZ (US) 85022

( * ) Notice: Subject to any disclaimer, the term of this patent is extended or adjusted under 35 U.S.C. 154(b) by 285 days.

(21) Appl. No.: 11/049,164

(22) Filed: Feb. 2, 2005

(51) Int. Cl.
*B62D 21/00* (2006.01)

(52) U.S. Cl. .................. 280/781; 180/311; 280/727; 280/785

(58) Field of Classification Search ............. 280/781, 280/785, 787, 797, 798, 727, 762, 124, 109; 180/311
See application file for complete search history.

(56) References Cited

U.S. PATENT DOCUMENTS

| | | | |
|---|---|---|---|
| 1,597,977 A | * | 8/1926 | Hufferd ............... 280/788 |
| 2,880,013 A | * | 3/1959 | Dean ................. 280/798 |
| 6,752,235 B1 | * | 6/2004 | Bell et al. ............. 180/360 |

* cited by examiner

*Primary Examiner*—Eric Culbreth
(74) *Attorney, Agent, or Firm*—Frank J. McGue

(57) ABSTRACT

A suspension lift mechanism is described for use with sport utility vehicles. Such sport utility vehicles have a pair of frame rails which have a plurality of suspension attachments positioned thereon. The elements of a suspension system are usually mounted on said suspension attachments. The suspension lift mechanism includes a pair of rear brackets consisting of a rear frame extension which has an upper surface adapted to mate with the lower surface of the frame rail. The rear frame extension has a plurality of suspension attachments positioned thereon and is mounted to a frame rail. A pair of front brackets consists of a front frame extension which has an upper surface of the front frame extension adapted to mate with the lower surface of the frame rail. The front frame extension has a plurality of suspension attachments positioned thereon and is mounted to the frame rail.

6 Claims, 4 Drawing Sheets

SUSPENSION LIFT BRACKETS

TECHNICAL FIELD

The present invention relates to suspension lift brackets for vehicles, and, more particularly, to suspension lift brackets for off-road vehicles.

BACKGROUND OF THE INVENTION

Lift brackets are used to install suspension parts in a lower position on a vehicle's frame to provide a higher ground clearance for said vehicle. The use of lift brackets allows a vehicle to clear higher obstacles thereby enhancing off road driving capabilities. Further, the use of lift brackets is considered to increase the aesthetics of the vehicle employing the lift brackets.

However, due to the unique nature of the suspension system of an off-road vehicle, no such lift brackets are available for those brands of vehicles. Thus, there is a need for a lift bracket suitable for use on off-road vehicles.

SUMMARY OF THE INVENTION

It is an object of this invention to provide lift brackets, two mirror image brackets for the rear, right and left side, and two mirror image brackets for the front, right and left side, suitable for use with off-road vehicles.

It is a further object of this invention to provide lift brackets to increase ground clearance, tire size and personal aesthetics of off-road vehicles.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
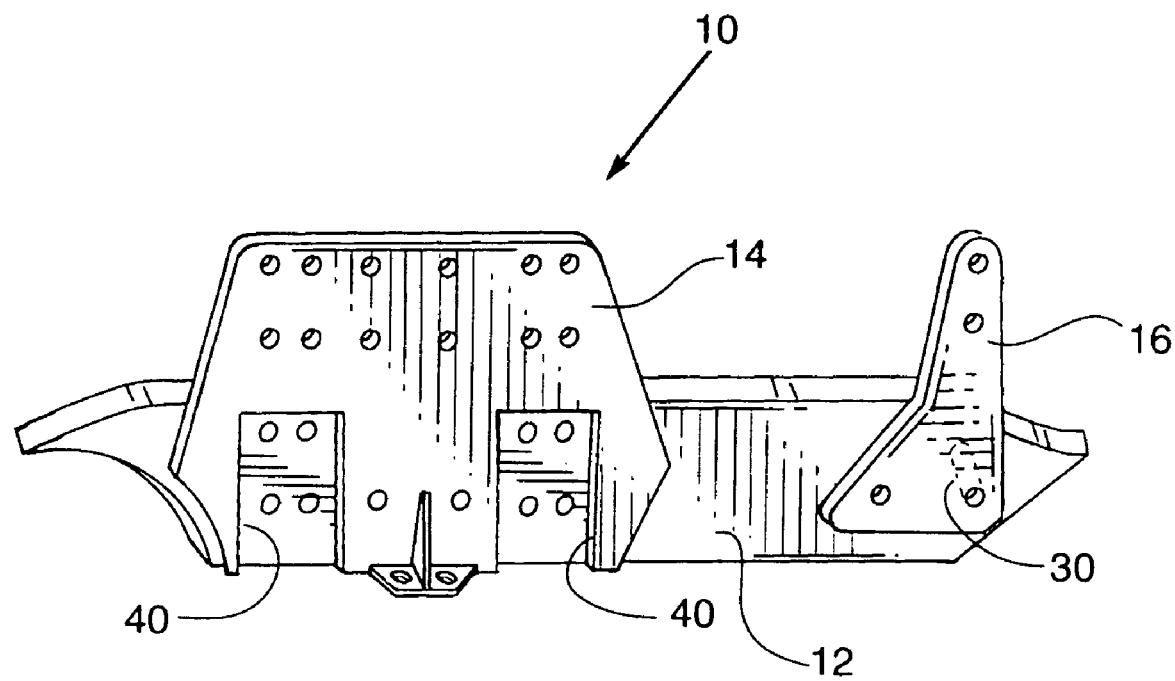
FIG. 1 is a perspective side view of the driver's side rear bracket of the present invention.
Figure 2:
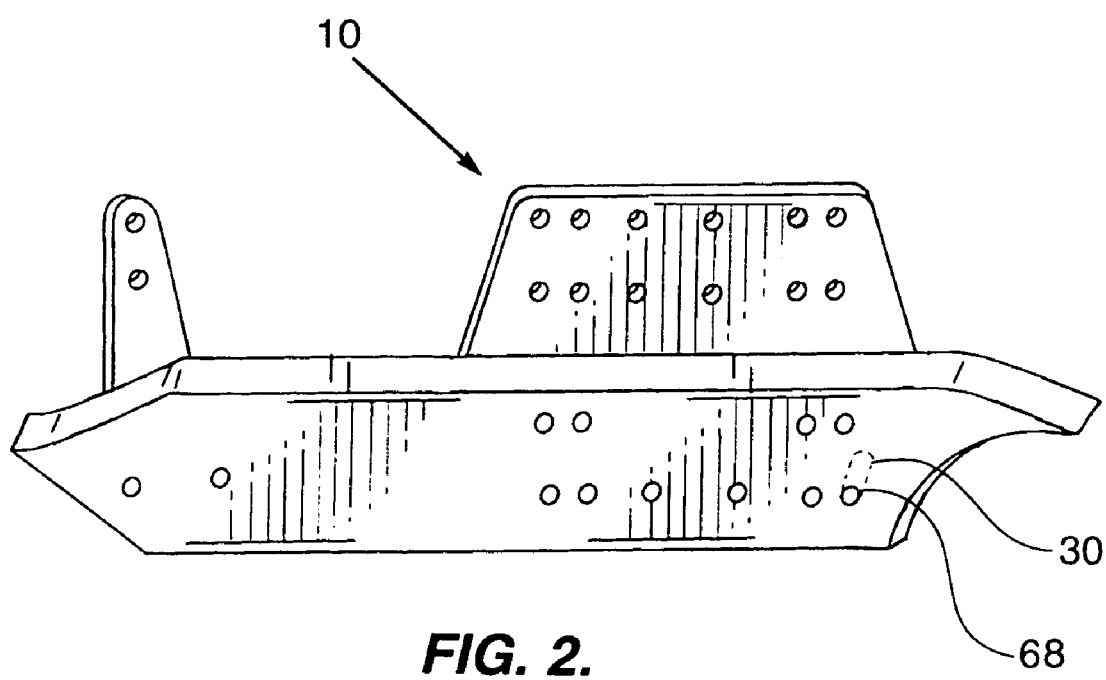
FIG. 2 is a reversed perspective side view of FIG. 1.
Figure 3:
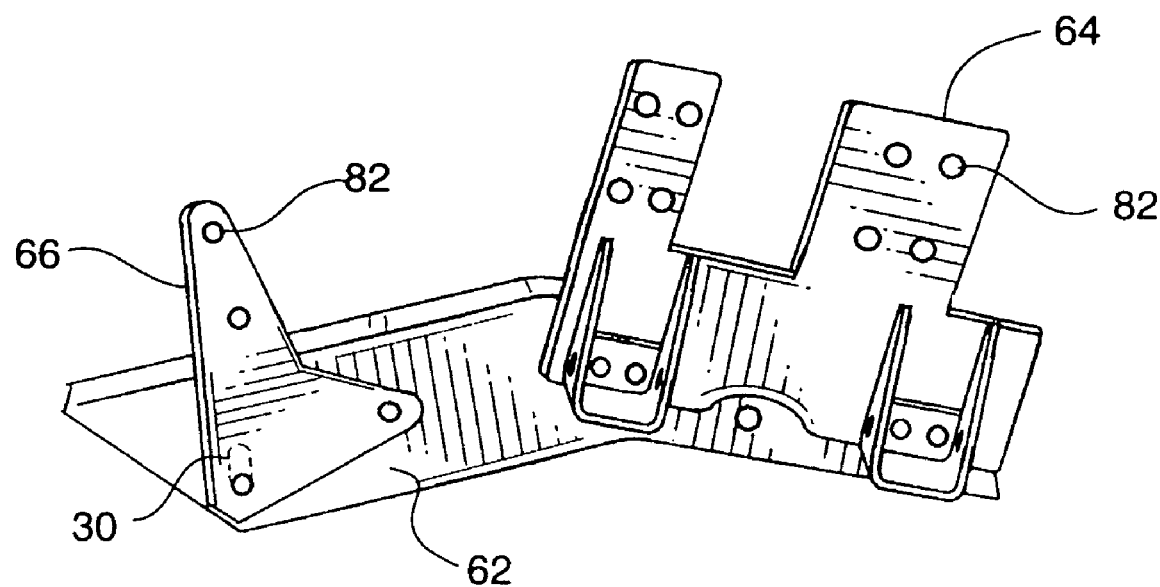
FIG. 3 is a perspective view of the driver's side front bracket.
Figure 4:
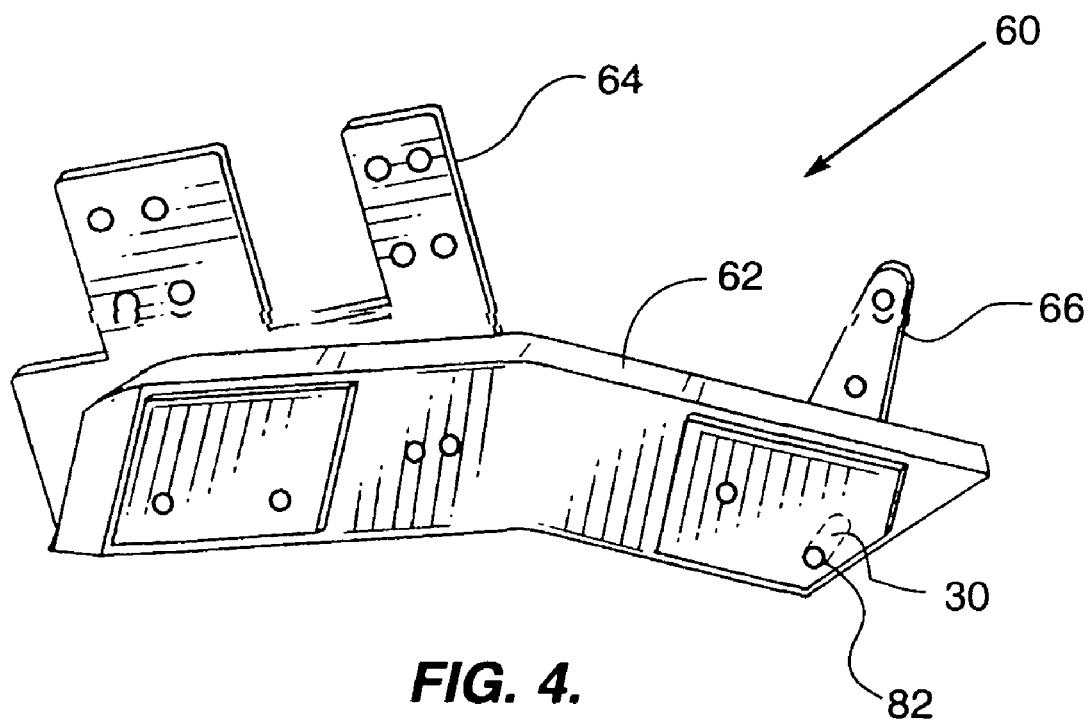
FIG. 4 is a reversed perspective side view of FIG. 3.
Figure 5:
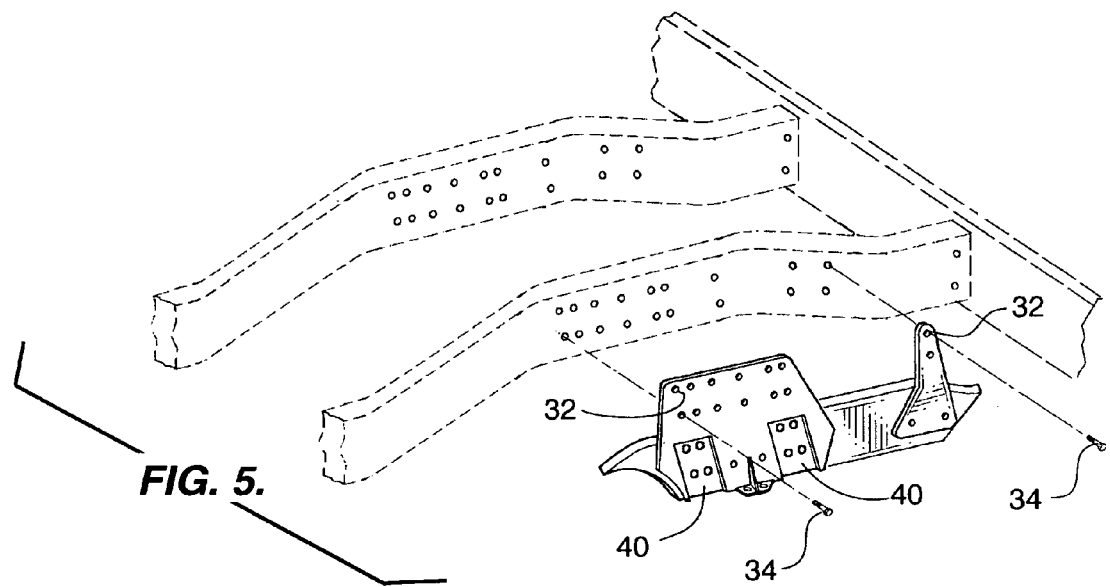
FIG. 5 is a perspective view of the driver's side rear bracket showing mounting locations therefore on a vehicle frame rail.
Figure 6:
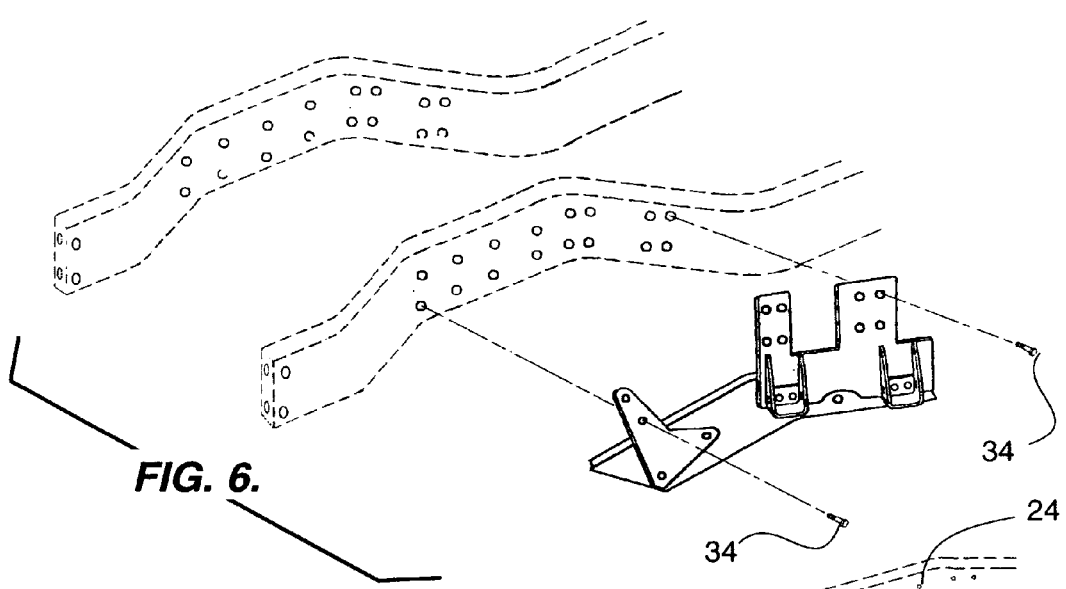
FIG. 6 is a perspective view of driver's side front bracket showing mounting locations therefore on the vehicle frame rail.

Referring more particularly to the drawings by characters of reference, FIGS. 1–9 disclose lift brackets 10 and 60 for use with off-road vehicles. As those skilled in the art will recognize, the discussion below shows the use of the invention with HUMMER H1® and HUMVEE® sport utility vehicles. However, the use of the HUMMER H1® and HUMVEE® sport utility vehicles is exemplary in nature and the present invention is not meant to be limited to that particular vehicle.

In addition, the present discussion will relate to lift brackets mounted on the driver's side of off-road vehicle; however, those skilled in the art will recognize that lift brackets for the passenger side of the vehicle are simply mirror images of the embodiments depicted in the drawings and described below. Further, those skilled in the art will recognize that the term driver's side refers to the left side of the vehicle in the United States and the majority of countries which drive on the right side of the road. Those skilled in the art will recognize that in those countries which drive on the left side, i.e. the United Kingdom, the driver's side is the right side.

Figure 7:
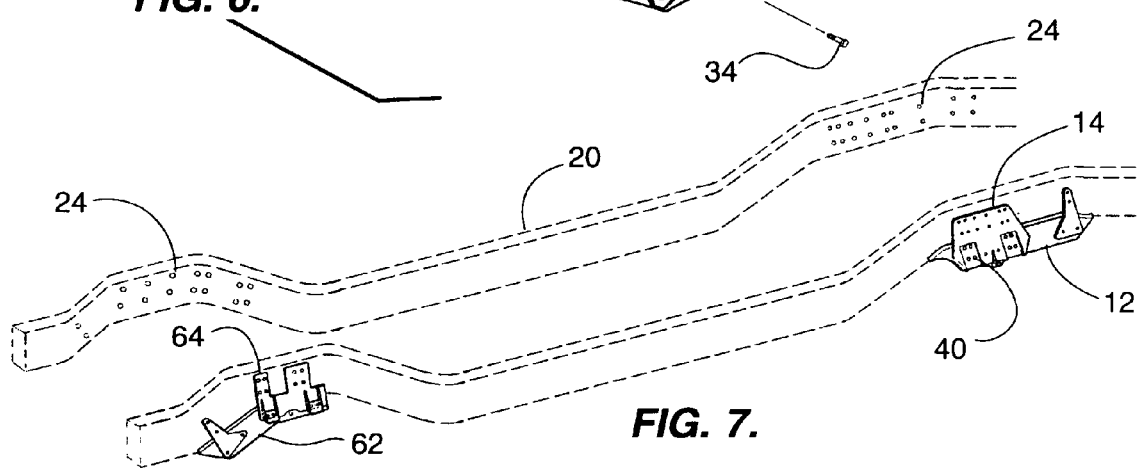
FIG. 7 is a perspective view of the left side front and rear brackets showing the mounting locations therefor on the vehicle frame rails.

As best seen in FIG. 7, two frame rails 20 extend the length of a off-road vehicle. At positions proximate to the location of wheel mounting plates 22, seen in FIGS. 8 and 9, on both the front and the back of frame rails 20, a plurality of holes 24 are drilled therethrough. Holes 24 are provided to mount elements of suspension systems 26 and 28 for the front and rear, respectively, said vehicle.

As best illustrated in FIGS. 1, 2, 5, 7 and 8, one portion of the present invention provides a driver's side rear bracket 10 which consists of a rear frame extension 12 having a first rear plate 14 and second rear plate 16 extending upwardly therefrom. The upper surface of rear frame extension 12 is designed to mate with the lower surface of frame rail 20 shown. Further, the shape of rear frame extension 12 corresponds, in general, to the shape of that portion of frame rail 20 to which said rear frame extension is mated. Rear frame extension 12 includes a plurality of holes 18 extending therethrough which correspond positionally to holes 24 but are offset a distance downwardly therefrom. For added support, sleeves 30 are provided in each of holes 18 which extend through rear frame extension 12.

As shown, first rear plate 14 and second rear plate 16 overlap the sides of both frame rail 20 and rear frame extension 12. First rear plate 14 and second rear plate 16 include a plurality of holes 32. Holes 32 are positioned to align with both holes 18 in rear frame extension 12 and holes 24 in frame rail 20. Bolts 34 extend through said holes to firmly secure, via plates 14 and 16, rear frame extension 12 to frame rail 20.

Figure 8:
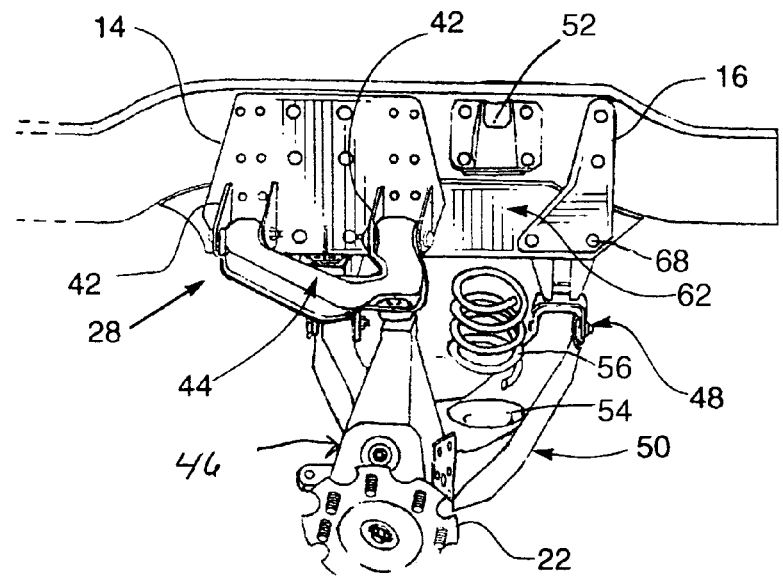
FIG. 8 shows the driver's side rear bracket of the present invention bracket mounted on the vehicle frame rail showing its relationship to other suspension parts on the vehicle in a partially exploded perspective view.
Figure 9:
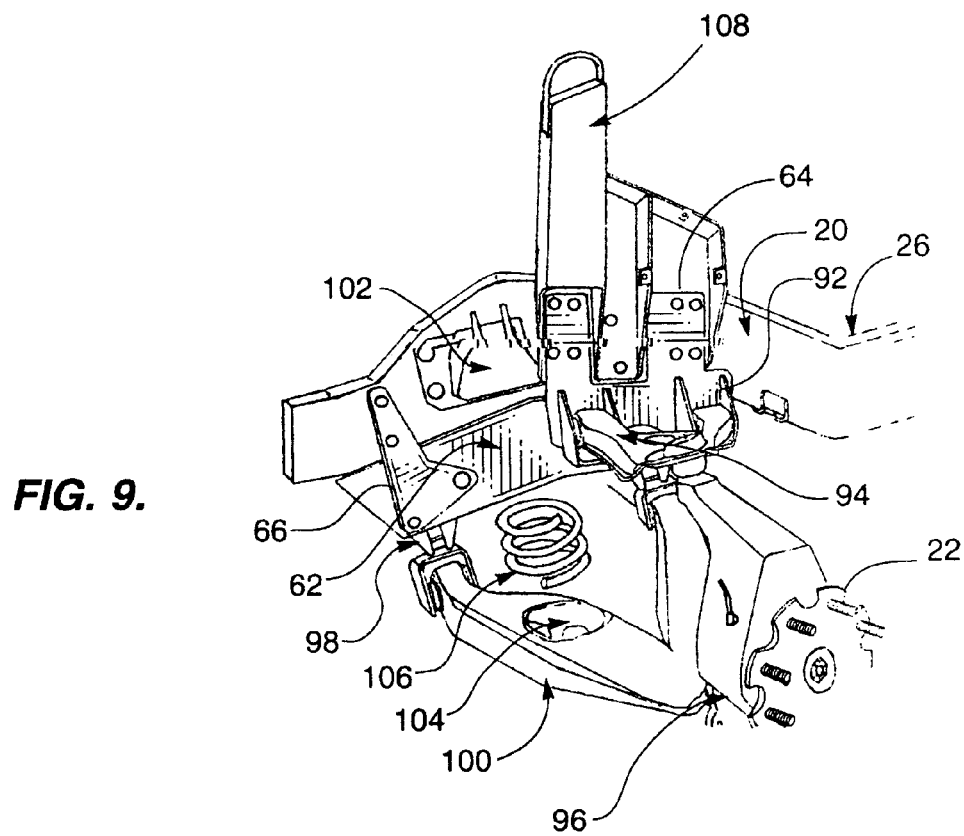
FIG. 9 shows the driver's side front bracket of the present invention mounted on vehicle frame rail showing its relationship to other suspension parts on the vehicle in a partially exploded perspective view.

As best seen in FIG. 8, rear frame extension 12 includes mounting elements, in the illustrated embodiment holes 18, to affix elements of rear suspension 28 which are normally mounted to frame rail 20 via holes 24. The net effect of use of rear frame extension 12 is to lift off-road vehicle body upward with respect to rear suspension 28 the distance equal to the distance between holes 18 and holes 24. This added distance increases the ground clearance and tire size and, depending upon personal preferences, increase the aesthetic appeal of the off-road vehicle.

As those skilled in the art will recognize, rear suspension 28 is well known and comprises a pair of rear control arm brackets 42, a rear upper control arm 44 mounted to said control arm brackets 42, a rear geared hub 46 including wheel mounting plate 22 operatively mounted to rear upper control arm 44 as well as a rear lowered cross member bracket 48 having a rear lower control arm 50 extending therefrom which is also operatively connected to rear geared hub 46. Suspension 28 also includes a rear spring seat 52 mounted intermediate between rear control arm brackets 42 and rear lowered cross member bracket 48, and a rear spring pocket 54 positioned on rear lower control arm 50 intermediate between rear lowered cross member bracket 48 and rear geared hub 46 and in alignment with rear spring seat 52. A rear coil spring 56 extends between rear spring seat 52 and rear spring pocket 54.

As shown, first rear plate 14 optionally includes two thin areas 40 which leave a portion of rear frame extension uncovered. In an alternate embodiment shown in FIG. 8, first rear plate 14 does not include said thin areas 40. In either embodiment, rear control arm brackets 42 are mounted via bolts 34 either directly to rear frame extension 12 when thin areas 40 are present, or to first rear plate 14 and rear frame extension 12 via bolts 34 which extend through both the first rear plate and the rear frame extension. Rear upper control arm 44 is mounted to both rear control arm brackets 42. Rear upper control arm 44 is, in turn, operatively connected to rear geared hub 46, said rear geared hub including wheel mounting plate 22.

Mounted to rear frame extension 12 opposite second rear plate 16 via bolts 34 is rear lowered cross member bracket 48. Rear lower control arm 50 extends therefrom and is operatively connected to rear geared hub 46. Intermediate between first rear plate 14 and second rear plate 16 is rear spring seat 52 which, in the preferred embodiment, is still mounted to frame rail 20. Intermediate between rear lowered cross member bracket 48 and rear geared hub 46 on rear lower control arm 50 is rear spring pocket 54 in alignment with rear spring seat 52. Rear coil spring 56 extends between rear spring seat 52 and rear spring pocket 54.

As best illustrated in FIGS. 3, 4,6, 7 and 9, one portion of the present invention provides a driver's side front bracket 60 which consists of a front frame extension 62 having a first front plate 64 and second front plate 66 extending upwardly therefrom. The upper surface of front frame extension 62 is designed to mate with the lower surface of frame rail 20 shown. Further, the shape of front frame extension 62 corresponds, in general, to the shape of that portion of frame rail 20 to which said front frame extension is mated. Front frame extension 62 includes a plurality of holes 68 extending therethrough which correspond positionally to holes 24 but are offset a distance downwardly therefrom. For added support, sleeves 30 are provided in each of holes 68 which extend through front frame extension 62.

As shown, first front plate 64 and second front plate 66 overlap the sides of both frame rail 20 and front frame extension 62. First front plate 64 and second front plate 66 include a plurality of holes 82. Holes 82 are positioned to align with both holes 68 in front frame extension 62 and holes 24 in frame rail 20. Bolts 34 extend through said holes to firmly secure, via plates 64 and 66, front frame extension 62 to frame rail 20.

As best seen in FIG. 8, front frame extension 62 includes mounting elements, in the illustrated embodiment holes 68, to affix elements of front suspension 26 which are normally mounted to frame rail 20 via holes 24. The net effect of use of front frame extension 62 is to lift off-road vehicle body upward with respect to front suspension 26 the distance equal to the distance between holes 68 and holes 24. This added distance increases the ground clearance and tire size and, depending upon personal preferences, increase the aesthetic appeal of the off-road vehicle.

As those skilled in the art will recognize, front suspension 26 is well known and comprises a pair of front control arm brackets 92, a front upper control arm 94 mounted to said front control arm brackets 92, a front geared hub 96 operatively to front upper control arm 94 and wheel mounting plate 22 mounted to front geared hub 96 as well as a front lowered cross member bracket 98 having a front lower control arm 100 extending therefrom which is also operatively connected to front geared hub 96. Suspension 26 also includes a front spring seat 102 mounted intermediate between front control arm brackets 92 and front lowered cross member bracket 98, and a front spring pocket 104 positioned on front lower control arm 100 intermediate between front lowered cross member bracket 98 and front geared hub 96 and in alignment with front spring seat 102. A front coil spring 106 extends between front spring seat 102 and front spring pocket 104. A front air lift bracket 108 extends upwardly opposite front upper control arm 94.

As shown, front control arm brackets 92 are mounted via bolts 34 to first front plate 64 and front frame extension 62 via bolts 34 which extend through both the first front plate and the front frame extension. Front upper control arm 94 is mounted to both front control arm brackets 92. Front upper control arm 94 is, in turn, operatively connected to front geared hub 96, said front geared hub including wheel mounting plate 22.

Mounted to front frame extension 62 opposite second front plate 66 via bolts 34 is front lowered cross member bracket 98. Front lower control arm 100 extends therefrom and is operatively connected to front geared hub 96. Intermediate between first front plate 64 and second front plate 66 is front spring seat 102 which, in the preferred embodiment, is still mounted to frame rail 20. Intermediate between front lowered cross member bracket 98 and front geared hub 96 on front lower control arm 100 is front spring pocket 104 in alignment with front spring seat 102. Front coil spring 106 extends between front spring seat 102 and front spring pocket 104. Since front air lift bracket 108 extends upwardly, said front air lift bracket remains mounted to frame rail 20.

Although only certain embodiments have been illustrated and described, it will be apparent to those skilled in the art that various changes and modifications may be made therein without departing from the spirit of the invention or from the scope of the appended claims.

The invention claimed is:

1. A suspension lift mechanism for use with sport utility vehicles having a pair of frame rails having a plurality of suspension attachments positioned on said frame rails for mounting the elements of a suspension system thereon, the suspension lift mechanism comprising:

a pair of rear brackets, each rear bracket consisting of a rear frame extension, the upper surface of the rear frame extension adapted to mate with the lower surface of a frame rail, the rear frame extension having a plurality of suspension attachments positioned thereon, a pair of front brackets, each front bracket consisting of a front frame extension, the upper surface of the front frame extension adapted to mate with the lower surface of a frame rail, the front frame extension having a plurality of suspension attachments positioned thereon, and a first rear plate and a second rear plate overlapping the sides of the frame rail and the rear frame extension and a first front plate and a second front plate overlapping the sides of the frame rail and the front frame extension, each of the first rear plate, the second rear plate, the first front plate and the second front plate including a plurality of holes which align with corresponding holes in the rear frame extension, the front frame extension and in the frame rail, and bolts extending through said holes to firmly secure the rear frame extension and the front frame extension to the frame rail.

2. A suspension lift mechanism for use with sport utility vehicles having a pair of frame rails having a plurality of suspension attachments positioned on said frame rails for mounting the elements of a suspension system thereon, the suspension lift mechanism comprising:
   a pair of rear brackets each rear bracket consisting of a rear frame extension, the upper surface of the rear frame extension adapted to mate with the lower surface of a frame rail, the rear frame extension having a plurality of suspension attachments positioned thereon, the rear frame extension having means for mounting to a frame rail, and
   a pair of front brackets each front bracket consisting of a front frame extension, the upper surface of the front frame extension adapted to mate with the lower surface of a frame rail, the front frame extension having a plurality of suspension attachments positioned thereon, the front frame extension having means for mounting to a frame rail; and
   wherein the plurality of suspension attachments positioned on the rear frame extension and the front frame extension correspond to the plurality of suspension attachments on the frame rail but are offset downwardly a predetermined distance therefrom.

3. The lift suspension mechanism of claim 2 wherein each of the suspension attachments are holes receiving corresponding bolts therethrough.

4. The lift suspension mechanism of claim 2 wherein a plurality of sleeves are provided which correspond to the plurality of holes in the rear frame extension and the front frame extension, the plurality of sleeves positioned within each of the plurality of holes and supporting same.

5. A suspension lift mechanism for use with sport utility vehicles having a pair of frame rails having a plurality of holes positioned on said frame rails for mounting the elements of a suspension system thereon, the suspension lift mechanism comprising:
   a pair of rear brackets, each rear bracket consisting of a rear frame extension, the upper surface of the rear frame extension adapted to mate with the lower surface of a frame rail, the rear frame extension having a plurality of holes positioned thereon which correspond to the plurality of holes on the frame rail but are offset downwardly a predetermined distance therefrom, the rear frame extension having a first rear plate and a second rear plate overlapping the sides of the frame rail and the rear frame extension, the first rear plate and the second rear plate including a plurality of holes which align with corresponding holes in the rear frame extension and in the frame rail, and bolts extending through said holes to firmly secure the rear frame extension to the frame rail, and
   a pair of front brackets, each front bracket consisting of a front frame extension, the upper surface of the front frame extension adapted to mate with the lower surface of a frame rail, the front frame extension having a plurality of holes positioned thereon which correspond to the plurality of holes on the frame rail but are offset downwardly a predetermined distance therefrom, the front frame extension having a first front plate and a second front plate overlapping the front frame extension and the frame rail, the first front plate and the second front plate including a plurality of holes which align with corresponding holes in the front frame extension and in the frame rail, and bolts extending through said holes to firmly secure the front frame extension to the frame rail.

6. The lift suspension mechanism of claim 5 wherein a plurality of sleeves are provided which correspond to the plurality of holes in the rear frame extension and the front frame extension, the plurality of sleeves positioned within each of the plurality of holes and supporting same.

* * * * *